(12) United States Patent
Zhong et al.

(10) Patent No.: US 9,115,308 B2
(45) Date of Patent: Aug. 25, 2015

(54) LIQUID CRYSTAL MEDIUM COMPOSITION OF LIQUID CRYSTAL DISPLAY

(75) Inventors: Xinhui Zhong, Guangdong (CN); Hongji Huang, Guangdong (CN); Kuancheng Lee, Guangdong (CN); Xiaolong Ma, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 95 days.

(21) Appl. No.: 13/698,029

(22) PCT Filed: Aug. 3, 2012

(86) PCT No.: PCT/CN2012/079618
§ 371 (c)(1),
(2), (4) Date: Nov. 14, 2012

(87) PCT Pub. No.: WO2014/012279
PCT Pub. Date: Jan. 23, 2014

(65) Prior Publication Data
US 2014/0021408 A1   Jan. 23, 2014

(30) Foreign Application Priority Data
Jul. 20, 2012   (CN) .......................... 2012 1 0253262

(51) Int. Cl.
| | |
|---|---|
| *C09K 19/54* | (2006.01) |
| *C09K 19/30* | (2006.01) |
| *C09K 19/12* | (2006.01) |
| *C09K 19/06* | (2006.01) |
| *C09K 19/32* | (2006.01) |
| *C09K 19/04* | (2006.01) |

(52) U.S. Cl.
CPC .............. *C09K 19/54* (2013.01); *C09K 19/062* (2013.01); *C09K 19/322* (2013.01); *C09K 2019/0448* (2013.01); *C09K 2019/122* (2013.01); *C09K 2019/3009* (2013.01)

(58) Field of Classification Search
CPC ................. C09K 19/54; C09K 19/322; C09K 2019/0448; C09K 2019/122; C09K 2019/3009
USPC ............. 252/299.01, 299.62, 299.63, 299.66, 252/299.67, 299.5
See application file for complete search history.

(56) References Cited

U.S. PATENT DOCUMENTS

| | | | |
|---|---|---|---|
| 6,781,665 B2 * | 8/2004 | Nakanishi et al. ............ 349/183 |
| 2009/0141215 A1 * | 6/2009 | Bremer et al. ................. 349/86 |
| 2010/0309423 A1 * | 12/2010 | Bernatz et al. ................ 349/183 |
| 2011/0248216 A1 * | 10/2011 | Klasen-Memmer et al. ....................... 252/299.62 |
| 2012/0033167 A1 * | 2/2012 | Mizusaki et al. ............. 349/123 |

FOREIGN PATENT DOCUMENTS

| | | | |
|---|---|---|---|
| DE | 102008064171 A1 * | 7/2010 |
| JP | 2001305734 A | 11/2001 |
| JP | 201218215 A | 1/2012 |
| JP | 2012018215 A | 1/2012 |
| WO | WO2010012363 A1 | 2/2010 |

* cited by examiner

*Primary Examiner* — Shean C Wu
(74) *Attorney, Agent, or Firm* — Andrew C. Cheng

(57) ABSTRACT

A liquid crystal medium composition of liquid crystal display includes: a negative liquid crystal material, reactive monomer, an initiator, and a stabilizer. The initiator functions to induce photo polymerization of the reactive monomer. The initiator has a molecular structure comprising aromatic rings, carbonyl groups connected to the aromatic rings, and substituted moieties connected to the aromatic rings. The initiator lowers the activation energy of chain initiation reaction of the polymerization of reactive monomer to allow the photo polymerization of the reactive monomer to take place in a wider wavelength range of 200-450 nm, so as to reduce the required intensity and luminance of ultraviolet light and to speed up the reaction of the reactive monomers and also to provide a uniform result of reaction, to reduce the destruction that the ultraviolet light causes on the material of alignment layer and the liquid crystal material, and to improve stability of the panel.

9 Claims, 2 Drawing Sheets

LIQUID CRYSTAL MEDIUM COMPOSITION OF LIQUID CRYSTAL DISPLAY

BACKGROUND OF THE INVENTION

1. Field of the Invention

The present invention relates to the field of liquid crystal displaying techniques, and in particular to a liquid crystal medium composition of liquid crystal display (LCD).

2. The Related Arts

In the liquid crystal display industry, the recently developed technique of polymer stabilized vertical alignment (PSVA) has various advantages, such as wide view angle, high contrast, and fast response, over the traditional twisted nematic/super twisted nematic (TN/STN) liquid crystal displaying techniques and also shows superiority to other vertical alignment (VA) techniques, such as multi-domain vertical alignment (MVA) and patterned vertical alignment (PVA) in respect to transmittance and simplification of manufacture process. Consequently, PSVA is the technical main stream of the contemporary thin-film transistor (TFT) LCD industry.

The key manufacture process of PSVA is illustrated in FIG. 1. PSVA techniques use negative liquid crystal material, in which when no electrical field is applied, the liquid crystal molecules 106 are arranged to perpendicular to substrate surfaces of upper and lower glass substrates 102, 100. ITO slits 101 are formed on a TFT side of the lower glass substrate 100, while ITO 104 of the upper glass substrate 102 remains intact. Monomer 108 that is referred to as reactive monomer (RM) is added in the liquid crystal material to carry out polymerization under irradiation of ultraviolet light. After the liquid crystal panel is assembled through dropping of liquid crystal therein, a signal of proper frequency, waveform, and voltage can be applied to the panel to have the liquid crystal molecules tilting in a predetermined direction, and at the same time, ultraviolet light is applied to irradiate the panel so as to polymerize the reactive monomers to form polymer deposited on the surface of the upper and lower glass substrates 102, 100 of the panel. The polymerized polymer deposit forms polymer bumps 110 that make the liquid crystal molecules 106 showing a predetermined tilt angle without application of electrical voltage thereto, whereby the response of the liquid crystal molecules are speeded up. An advantage of this technique is that multi-angle alignment (generating pre-tilt angle) can be realized in the panel.

The photo-reactive groups contained in the reactive monomers that most commonly used in the state-of-the-art PSVA technique are often methacrylate group, ethenyl group, ethyleneoxy group, or epoxy group, among which the commonly used one is methacrylate group. The wavelength that may cause photo polymerization of reactive monomers that contain such groups are of a range of 200-300 nm. Ultraviolet light having a wavelength exceeding 300 nm may cause the reaction of the reactive monomers, but the efficiency is low and speed is slow, making it showing no excellent productivity. Therefore, irradiation of the panel must be done with a light source having a wavelength lower than 300 nm in order to make the reactive monomers react. However, using a light source having a wavelength less than 300 nm brings certain drawbacks and troubles to the manufacture of the panel. Firstly, ultraviolet light with a wavelength less than 300 nm has a more intense energy, which may cause degradation and damage of polyimide that is the material of the alignment layer and VA liquid crystal molecules adopted in the technique, making voltage holding ratio (VHR) of the panel lowered, image sticking becoming severe, and reliability analysis (RA) poor. Further, the glass that is used to make the upper and lower glass substrates of an LCD generally shows absorbability of ultraviolet light having a wavelength less than 300 nm. As illustrated in the transmission spectrum of liquid crystal with respect to ultraviolet light shown in FIG. 2, it is noted that ultraviolet light with a wavelength less than 300 is completely blocked from transmitting through the liquid crystal material. In other words, most of the ultraviolet light from the light source is absorbed by the liquid crystal material (thus causing an effect of damage) and only a minor portion is absorbed by the reactive monomer to induce the polymerization reaction. This occurs at a very shallow position at the light incidence side, and thus non-uniformity of reaction of the reactive monomers at the light incidence side and the side away from light may result, leading to deteriorated effect of alignment for the panel.

SUMMARY OF THE INVENTION

An object of the present invention is to provide a liquid crystal medium composition of liquid crystal display, which allows photo polymerization of reactive monomer to take place in a wide wavelength range of 200-450 nm through the use of initiator, so as to reduce the required intensity and luminance of ultraviolet light and to speed up the reaction of the reactive monomers and at the same time to provide a uniform result of reaction, to reduce the destruction that the ultraviolet light causes on the material of alignment layer and the liquid crystal material, and to improve stability of the panel.

To achieve the object, the present invention provides a liquid crystal medium composition of liquid crystal display, which comprises: a negative liquid crystal material, reactive monomer, an initiator, and a stabilizer. The initiator functions to induce photo polymerization of the reactive monomer. The initiator has a molecular structure comprising aromatic rings, carbonyl groups connected to the aromatic rings, and substituted moieties connected to the aromatic rings.

The initiator has at least one of the following structural formulas:

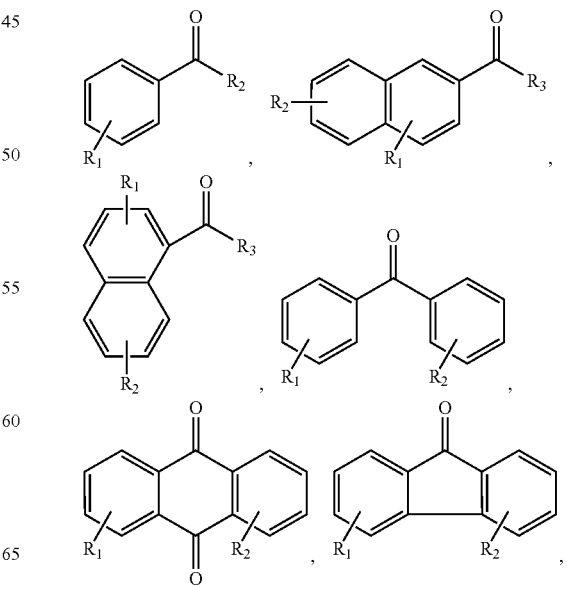

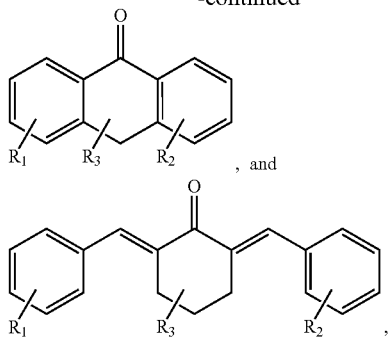

, and

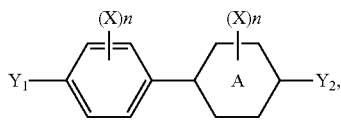

, wherein in the above structural formulas, R1, R2 and R3 are substituted moieties that are any moieties and the substituted moieties that are connected to the aromatic rings are one or more and are not limited to any location.

The initiator is of an amount of 5-1000 ppm in the liquid crystal medium composition.

The photo polymerization of the reactive monomer takes place in a primary wavelength range of 200-450 nm.

The negative liquid crystal material comprises at least one liquid crystal compound having the following formula:

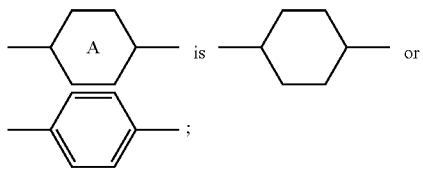

wherein in the formula,

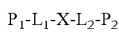 is 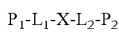 or 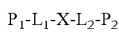 ;

X represents substituted moieties connected to the rings, n being an integer of 1-4, n being of different or the same values for different rings, whereby n>1 indicates an individual ring structure has a plurality of identical or different substituted moieties X, X being: —H, —F, —Cl, —Br, —I, —CN, or —NO$_2$; Y1 and Y2 are —R, —O—R, —CO—R, —OCO—R, —COO—R, or —(OCH$_2$CH$_2$)$n_1$CH$_3$, R representing a C1-12 linear or branched alkyl, $n_1$ being an integer of 1-5, Y1 and Y2 being identical or different.

The reactive monomer comprises at least one polymerizable compound having the following formula:

P$_1$-L$_1$-X-L$_2$-P$_2$ wherein P$_1$ and P$_2$ represent polymerizable moieties, which are identical or different, P$_1$ and P$_2$ being methacrylate, acrylate, ethenyl, ethyleneoxy, or epoxy groups; L$_1$ and L$_2$ represent linking moieties, which are identical or different, L$_1$ and L$_2$ being —C—C—, —O—, —COO—, —OCO—, —CH$_2$O—, —OCH$_2$O—, —O(CH$_2$)$_2$O—, —COCH$_2$—, or methylenyl; X represents a core moiety, which has the following formula:

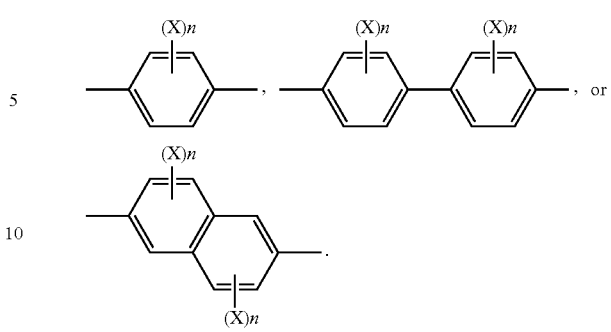

In the formula of the core moiety X, x represents a substituted moiety connected to the ring structure, n is an integer of 1-4, whereby n>1 indicates an individual ring structure has a plurality of substituted moieties x, which is identical or different, x being specifically —H, —F, —Cl, —Br, —I, —CN, or —NO$_2$.

The stabilizer comprises at least one stabilizer compound represented by the following formula:

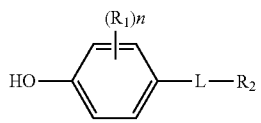

wherein R$_1$ represents a C1-9 linear or branched alkyl, n is an integer of 1-4, whereby n>1 indicates an individual ring structure has a plurality of substituted moieties R$_1$, which is identical or different, R$_2$ represents a C1-36 linear or branched alkyl; L is —C—C—, —O—, —COO—, —OCO—, —CH$_2$O—, —OCH$_2$O—, —O(CH$_2$)$_2$O—, —COCH$_2$—, or methylenyl.

The negative liquid crystal material has a weight that is of an amount of 99-99.9% of the total weight of the liquid crystal medium composition. The reactive monomer has a weight that is of an amount of 0.1-1% of the total weight of the liquid crystal medium composition. The stabilizer is of an amount of 10-100 ppm.

The initiator is at least one of the following formulas:

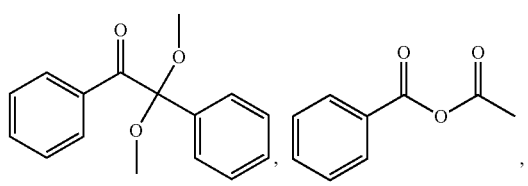

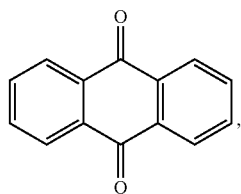

,

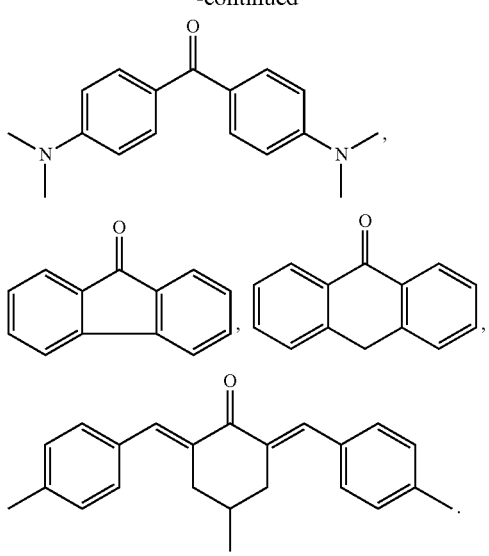

The present invention also provides a liquid crystal medium composition of liquid crystal display, comprising: a negative liquid crystal material, reactive monomer, an initiator, and a stabilizer, the initiator functioning to induce photo polymerization of the reactive monomer, the initiator having a molecular structure comprising aromatic rings, carbonyl groups connected to the aromatic rings, and substituted moieties connected to the aromatic rings;

wherein the initiator has at least one of the following structural formulas:

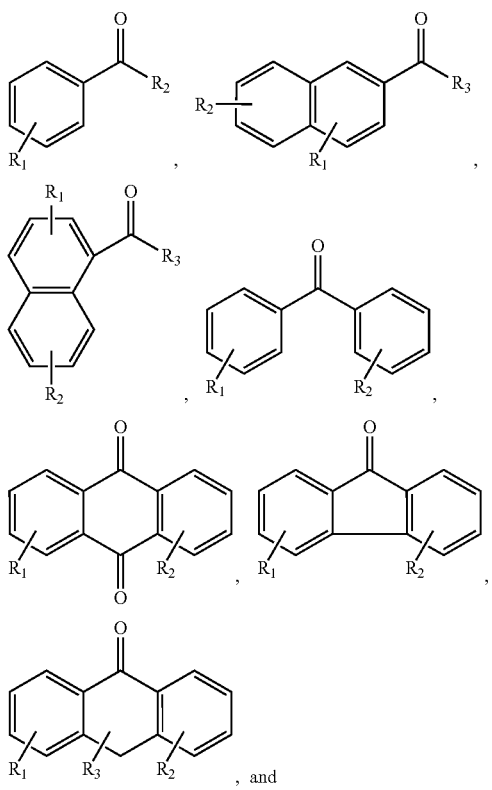, and

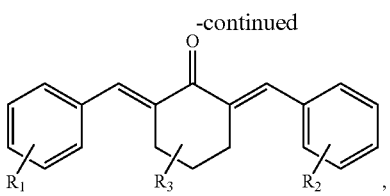

wherein in the above structural formulas, R1, R2 and R3 are substituted moieties that are any moieties and the substituted moieties that are connected to the aromatic rings are one or more and are not limited to any location;

wherein the initiator is of an amount of 5-1000 ppm in the liquid crystal medium composition;

wherein the negative liquid crystal material comprises at least one liquid crystal compound having the following formula:

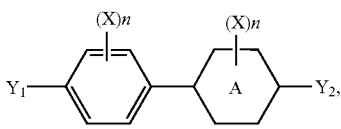

wherein in the formula,

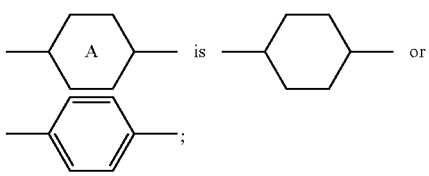

X represents substituted moieties connected to the rings, n being an integer of 1-4, n being of different or the same values for different rings, whereby n>1 indicates an individual ring structure has a plurality of identical or different substituted moieties X, X being: —H, —F, —Cl, —Br, —I, —CN, or —NO$_2$; Y1 and Y2 are —R, —O—R, —CO—R, —OCO—R, —COO—R, or —(OCH$_2$CH$_2$)n$_1$CH$_3$, R representing a C1-12 linear or branched alkyl, n$_1$ being an integer of 1-5, Y1 and Y2 being identical or different;

wherein the reactive monomer comprises at least one polymerizable compound having the following formula:

P$_1$-L$_1$-X-L$_2$-P$_2$ wherein P$_1$ and P$_2$ represent polymerizable moieties, which are identical or different, P$_1$ and P$_2$ being methacrylate, acrylate, ethenyl, ethyleneoxy, or epoxy groups; L$_1$ and L$_2$ represent linking moieties, which are identical or different, L$_1$ and L$_2$ being —C—C—, —O—, —COO—, —OCO—, —CH$_2$O—, —OCH$_2$O—, —O(CH$_2$)$_2$O—, —COCH$_2$—, or methylenyl; X represents a core moiety, which has the following formula:

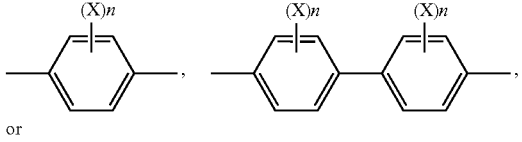

or

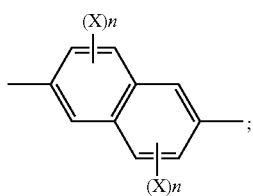

wherein in the formula of the core moiety X, x represents a substituted moiety connected to the ring structure, n is an integer of 1-4, whereby n>1 indicates an individual ring structure has a plurality of substituted moieties x, which is identical or different, x being specifically —H, —F, —Cl, —Br, —I, —CN, or —NO$_2$;

wherein the stabilizer comprises at least one stabilizer compound represented by the following formula:

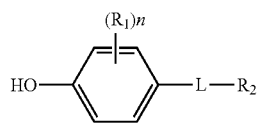

wherein R$_1$ represents a C1-9 linear or branched alkyl, n is an integer of 1-4, whereby n>1 indicates an individual ring structure has a plurality of substituted moieties R$_1$, which is identical or different, R$_2$ represents a C1-36 linear or branched alkyl; L is —C—C—, —O—, —COO—, —OCO—, —CH$_2$O—, —OCH$_2$O—, —O(CH$_2$)$_2$O—, —COCH$_2$—, or methylenyl;

wherein the negative liquid crystal material is of an amount of 99-99.9% of the total weight of the liquid crystal medium composition, the reactive monomer is of an amount of 0.1-1% of the total weight of the liquid crystal medium composition, and the stabilizer is of an amount of 10-100 ppm; and wherein the initiator is at least one of the following formulas:

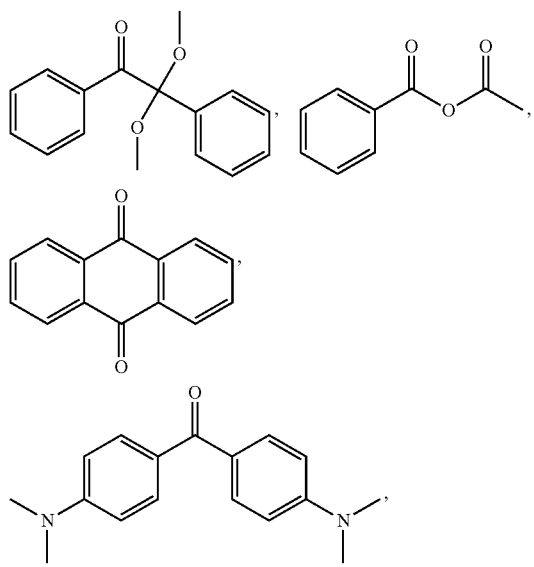

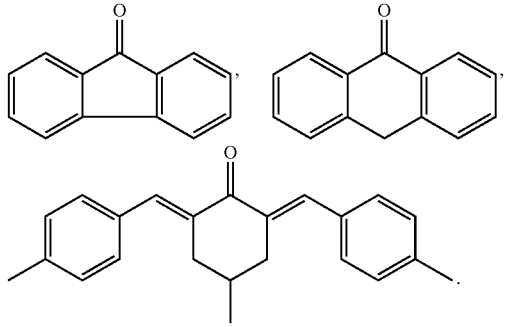

The efficacy of the present invention is that the present invention provides a liquid crystal medium composition of liquid crystal display, which comprises an initiator that lower the activation energy of chain initiation reaction of the polymerization of reactive monomer to allow the photo polymerization of the reactive monomer to take place in a wider wavelength range of 200-450 nm, so as to reduce the required intensity and luminance of ultraviolet light and to speed up the reaction of the reactive monomers and at the same time to provide a uniform result of reaction, to reduce the destruction that the ultraviolet light causes on the material of alignment layer and the liquid crystal material, and to improve stability of the panel.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, of the present invention will be apparent from the following detailed description of one or more embodiments of the present invention, with reference to the attached drawings. In the drawings.

DETAILED DESCRIPTION OF THE PREFERRED EMBODIMENTS

Figure 1:
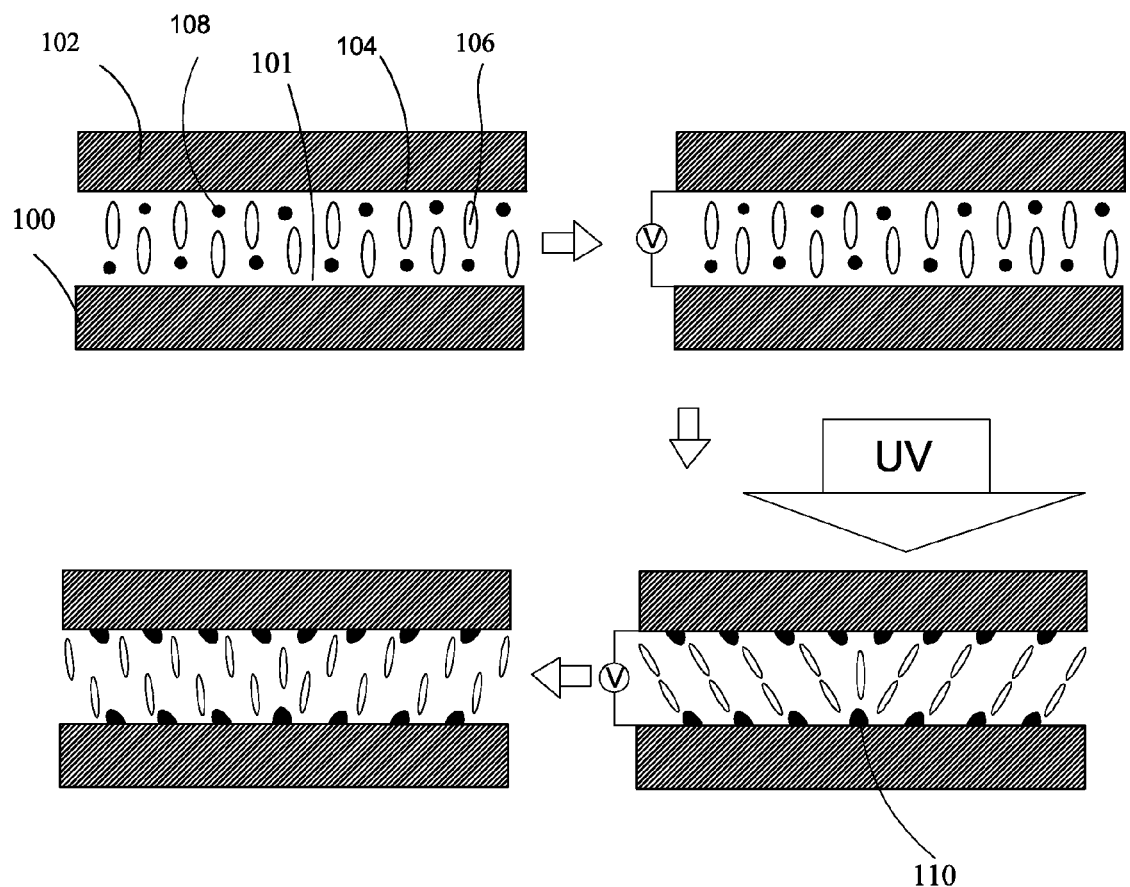
FIG. 1 is a schematic view illustrating the process of alignment of liquid crystal in a liquid crystal display manufactured with the conventional polymer stabilized vertical alignment technique.
Figure 2:
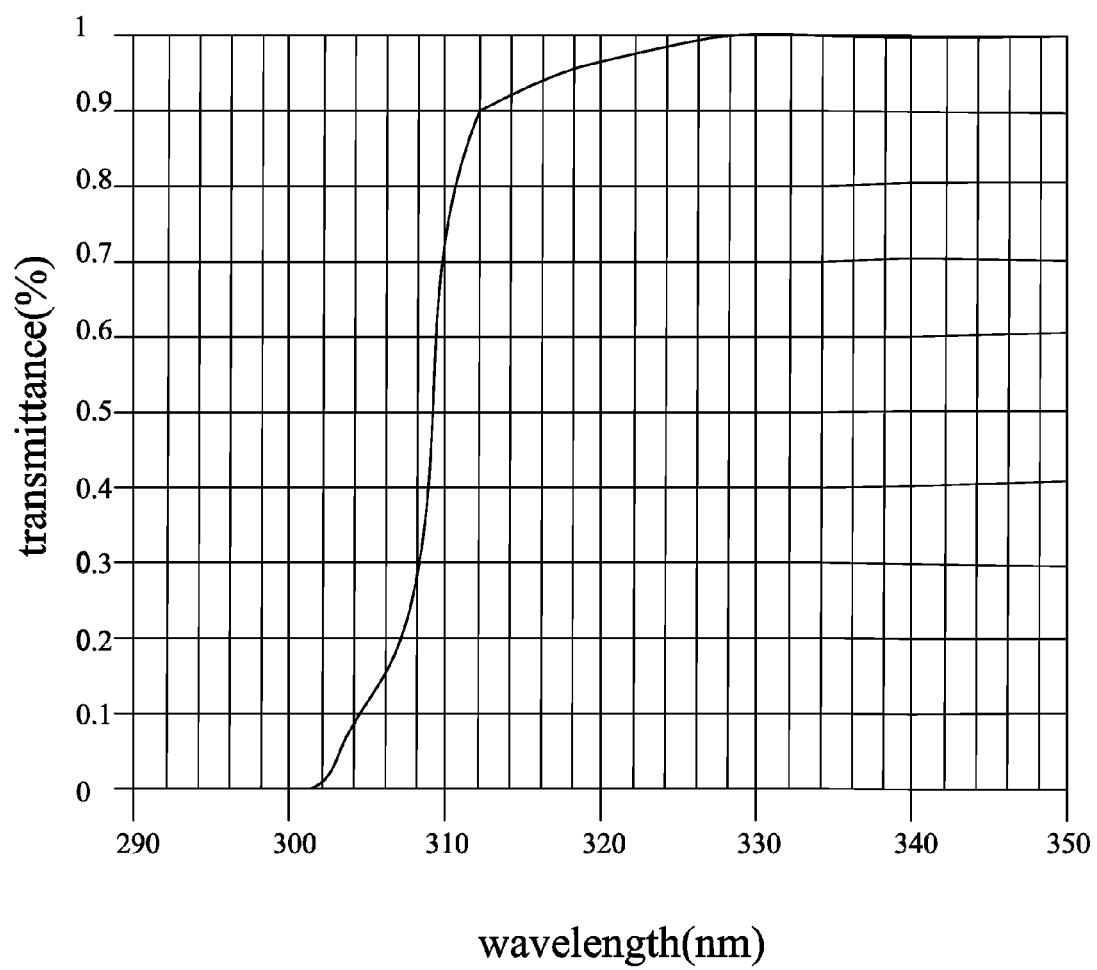
FIG. 2 is a plot showing the relationship between the transmittance of liquid crystal material and wavelength of ultraviolet light when the ultraviolet light irradiates a liquid crystal panel.

To further expound the technical solution adopted in the present invention and the advantages thereof, a detailed description is given to a preferred embodiment of the present invention and the attached drawings.

The present invention provides a liquid crystal medium composition of liquid crystal display. The liquid crystal medium composition comprises: a negative liquid crystal material, reactive monomer, an initiator, and a stabilizer. The initiator functions to induce photo polymerization of the reactive monomer. The initiator has a molecular structure comprising aromatic rings, carbonyl groups connected to the aromatic rings, and substituted moieties connected to the aromatic rings. The initiator may widen the primary wavelength range in which the reactive monomer reacts from the original range of 200-300 nm to a range of 200-450 nm. Through the effect of the initiator, the efficiency that the photo polymerization takes on the reactive monomer is increased and the reaction speed is increased so that the intensity of irradiating ultraviolet light can be properly lowered down to reduce the damage that the ultraviolet light causes on the liquid crystal material and the alignment layer material and to improve the reliability of display devices.

The initiator has at least one of the following structural formulas:

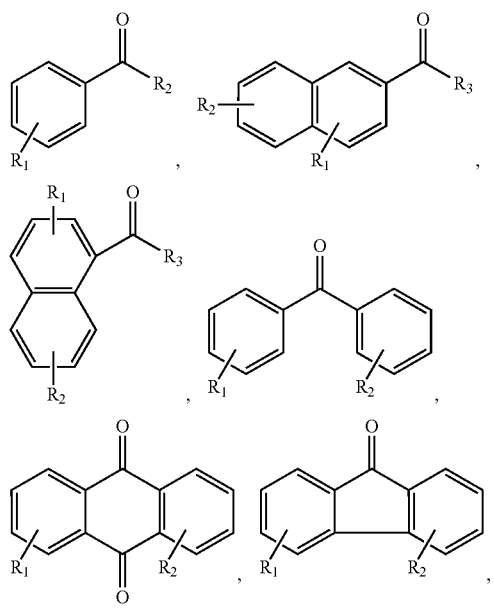

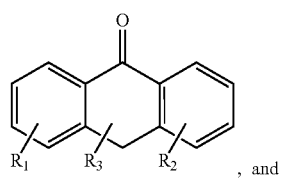, and

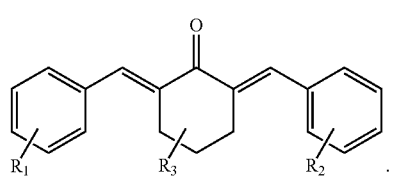.

In the above structural formulas, R1, R2 and R3 are substituted moieties that are any moieties and the substituted moieties that are connected to the aromatic rings are one or more and are not limited to any location.

The initiator is of an amount of 5-1000 ppm in the liquid crystal medium composition. The initiator can be individually added in the liquid crystal medium composition or may alternatively be a mixed combination of multiple ones that is added to the liquid crystal medium composition. The initiator used in the present invention has the following formulas:

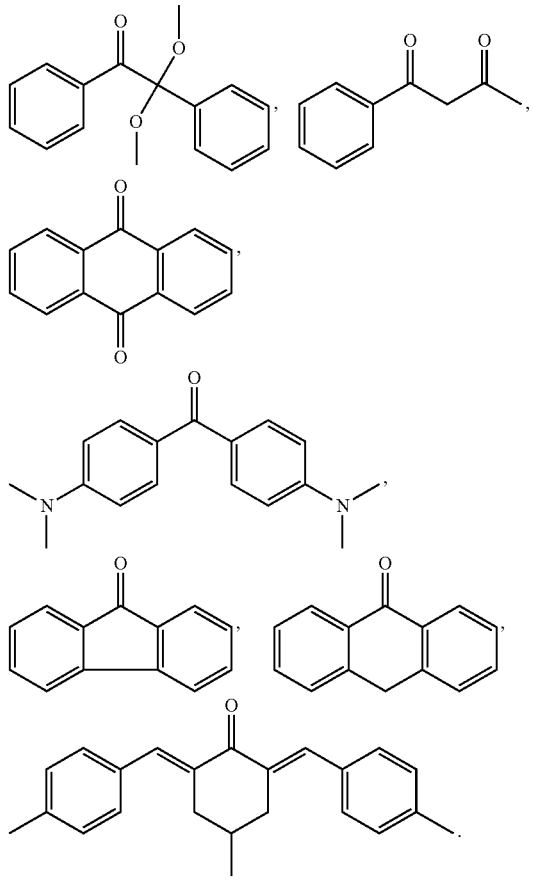

The photo polymerization of the reactive monomer takes place in a primary wavelength range of 200-450 nm, which is greatly widened as compared to the original wavelength range of 200-300 nm where no initiator is added.

The negative liquid crystal material comprises at least one liquid crystal compound having the following formula:

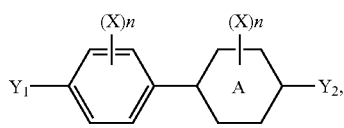

wherein in the formula,

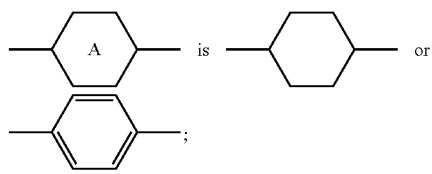

X represents substituted moieties connected to the rings, n being an integer of 1-4, n being of different or the same values for different rings, whereby n>1 indicates an individual ring structure has a plurality of identical or different substituted moieties X, X being: —H, —F, —Cl, —Br, —I, —CN, or —NO$_2$; Y1 and Y2 are —R, —O—R, —CO—R, —OCO—R, —COO—R, or —(OCH$_2$CH$_2$)n$_1$CH$_3$, R representing a C1-12 linear or branched alkyl, $n_1$ being an integer of 1-5, Y1 and Y2 being identical or different.

The reactive monomer comprises at least one polymerizable compound having the following formula:

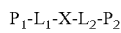

wherein $P_1$ and $P_2$ represent polymerizable moieties, which are identical or different, $P_1$ and $P_2$ being methacrylate, acrylate, ethenyl, ethyleneoxy, or epoxy groups; $L_1$ and $L_2$ represent linking moieties, which are identical or different, $L_1$ and $L_2$ being —C—C—, —O—, —COO—, —OCO—, —CH$_2$O—, —OCH$_2$O—, —O(CH$_2$)$_2$O—, —COCH$_2$—, or methylenyl; X represents a core moiety, which has the following formula:

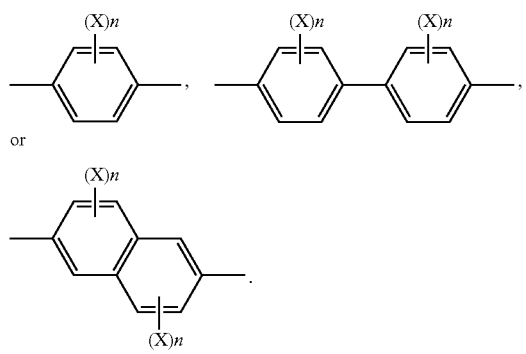

In the formula of the core moiety X, x represents a substituted moiety connected to the ring structure, n is an integer of 1-4, whereby n>1 indicates an individual ring structure has a plurality of substituted moieties x, which is identical or different, x being specifically —H, —F, —Cl, —Br, —I, —CN, or —NO$_2$.

The reactive monomer used in the present invention is preferably of the following structure:

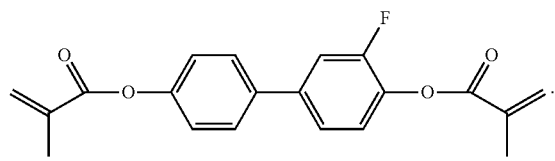 [SMILES: C=C(C)C(=O)Oc1ccc(-c2ccc(OC(=O)C(=C)C)c(F)c2)cc1]

The stabilizer comprises at least one stabilizer compound represented by the following formula:

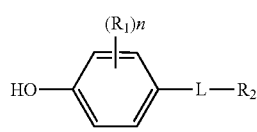

wherein $R_1$ represents a C1-9 linear or branched alkyl, n is an integer of 1-4, whereby n>1 indicates an individual ring structure has a plurality of substituted moieties $R_1$, which is identical or different, $R_2$ represents a C1-36 linear or branched alkyl; L is —C—C—, —O—, —COO—, —OCO—, —CH$_2$O—, —OCH$_2$O—, —O(CH$_2$)$_2$O—, —COCH$_2$—, or methylenyl.

The stabilizer used in the present invention is preferably of the following structure:

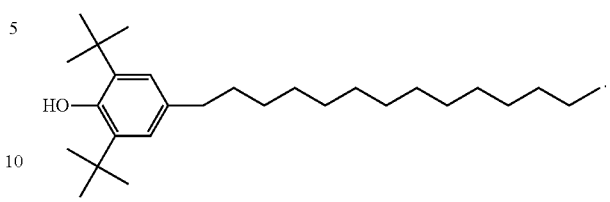

The negative liquid crystal material has a weight that is of an amount of 99-99.9% of the total weight of the liquid crystal medium composition. The reactive monomer has a weight that is of an amount of 0.1-1% of the total weight of the liquid crystal medium composition. The stabilizer is of an amount of 10-100 ppm.

Examples will be discussed to describe the present invention.

Example 1

In the instant embodiment, a negative liquid crystal material having Δn=0.1 and Δε=−3 is adopted.

The reactive monomer has the following structural formula:

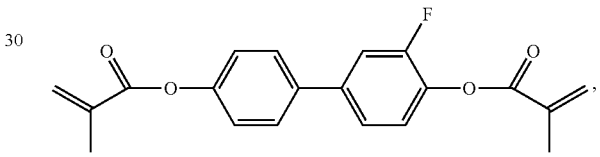

having an amount of 0.35%.

The stabilizer has the following structural formula:

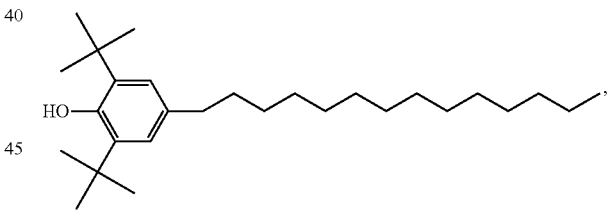

having an amount of 10 ppm.

The initiator has the following structural formula:

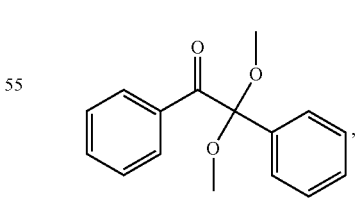

having an amount of 50 ppm.

Example 2

In the instant example, the negative liquid crystal material, the reactive monomer, and the stabilizer are identical to the counterparts of Example 1 and the initiator has the following structural formula:

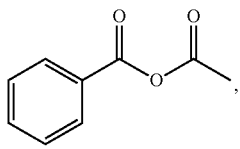

having an amount of 60 ppm.

Example 3

In the instant example, the negative liquid crystal material, the reactive monomer, and the stabilizer are identical to the counterparts of Example 1 and the initiator has the following structural formula:

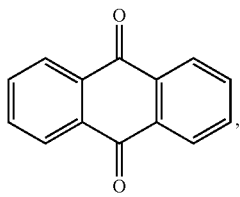 [SMILES: O=C1c2ccccc2C(=O)c2ccccc21]

having an amount of 30 ppm.

Example 4

In the instant example, the negative liquid crystal material, the reactive monomer, and the stabilizer are identical to the counterparts of Example 1 and the initiator has the following structural formula:

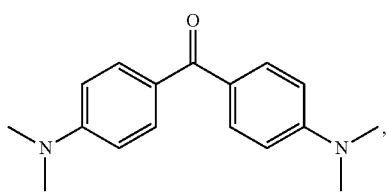

having an amount of 45 ppm.

Example 5

In the instant example, the negative liquid crystal material, the reactive monomer, and the stabilizer are identical to the counterparts of Example 1 and the initiator has the following structural formula:

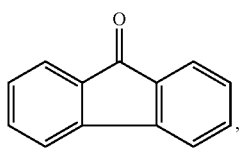 [SMILES: O=C1c2ccccc2-c2ccccc21]

having an amount of 35 ppm.

Example 6

In the instant example, the negative liquid crystal material, the reactive monomer, and the stabilizer are identical to the counterparts of Example 1 and the initiator has the following structural formula:

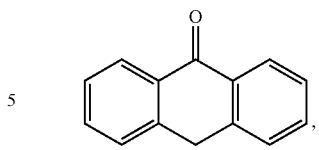

having an amount of 20 ppm.

Example 7

In the instant example, the negative liquid crystal material, the reactive monomer, and the stabilizer are identical to the counterparts of Example 1 and the initiator has the following structural formula:

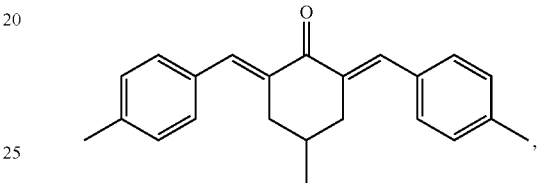

having an amount of 25 ppm.

In summary, the present invention provides a liquid crystal medium composition of liquid crystal display, which comprises an initiator that lower the activation energy of chain initiation reaction of the polymerization of reactive monomer to allow the photo polymerization of the reactive monomer to take place in a wider wavelength range of 200-450 nm, so as to reduce the required intensity and luminance of ultraviolet light and to speed up the reaction of the reactive monomers and at the same time to provide a uniform result of reaction, to reduce the destruction that the ultraviolet light causes on the material of alignment layer and the liquid crystal material, and to improve stability of the panel.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A liquid crystal medium composition of liquid crystal display, comprising: a negative liquid crystal material, reactive monomer, an initiator, and a stabilizer, the initiator functioning to induce photo polymerization of the reactive monomer, wherein the initiator has at least one of the following structural formulas:

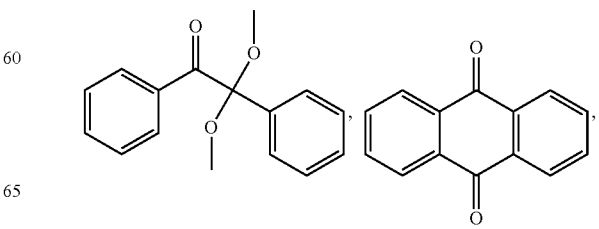

-continued

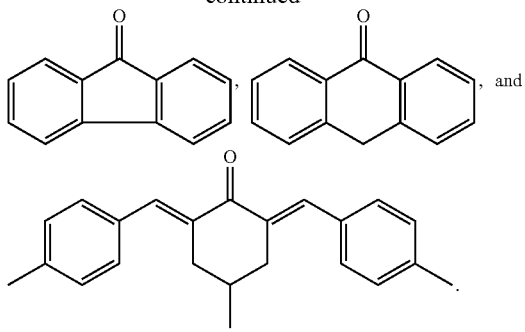, and

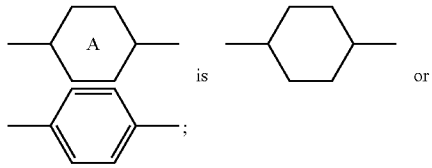

2. The liquid crystal medium composition as claimed in claim 1, wherein the initiator is of an amount of 5-1000 ppm in the liquid crystal medium composition.

3. The liquid crystal medium composition as claimed in claim 1, wherein the photo polymerization of the reactive monomer takes place in a primary wavelength range of 200-450 nm.

4. The liquid crystal medium composition as claimed in claim 1, wherein the negative liquid crystal material comprises at least one liquid crystal compound having the following formula:

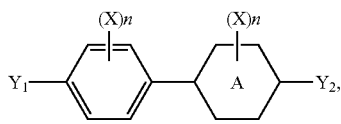

wherein in the formula,

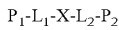 A 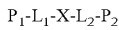 is 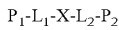 or 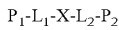 ;

X represents substituted moieties connected to the rings, n being an integer of 1-4, n being of different or the same values for different rings, whereby n>1 indicates an individual ring structure has a plurality of identical or different substituted moieties X, X being: —H, —F, —Cl, —Br, —I, —CN, or —NO$_2$; Y1 and Y2 are —R, —O—R, —CO—R, —OCO—R, —COO—R, or —(OCH$_2$CH$_2$)n$_1$CH$_3$, R representing a C1-12 linear or branched alkyl, n$_1$ being an integer of 1-5, Y1 and Y2 being identical or different.

5. The liquid crystal medium composition as claimed in claim 1, wherein the reactive monomer comprises at least one polymerizable compound having the following formula:

P$_1$-L$_1$-X-L$_2$-P$_2$ wherein P$_1$ and P$_2$ represent polymerizable moieties, which are identical or different, P$_1$ and P$_2$ being methacrylate, acrylate, ethenyl, ethyleneoxy, or epoxy groups; L$_1$ and L$_2$ represent linking moieties, which are identical or different, L$_1$ and L$_2$ being —C—C—, —O—, —COO—, —OCO—, —CH$_2$O—, —OCH$_2$O—, —O(CH$_2$)$_2$O—, —COCH$_2$—, or methylenyl; X represents a core moiety, which has the following formula:

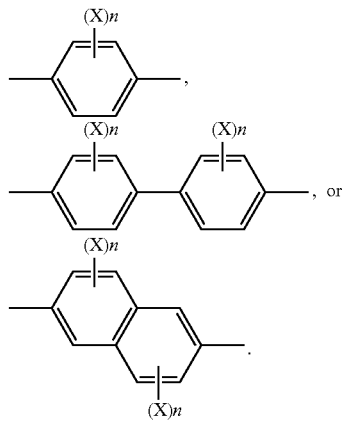

6. The liquid crystal medium composition as claimed in claim 5, wherein in the formula of the core moiety X, x represents a substituted moiety connected to the ring structure, n is an integer of 1-4, whereby n>1 indicates an individual ring structure has a plurality of substituted moieties x, which is identical or different, x being specifically —H, —F, —Cl, —Br, —I, —CN, or —NO$_2$.

7. The liquid crystal medium composition as claimed in claim 1, wherein the stabilizer comprises at least one stabilizer compound represented by the following formula:

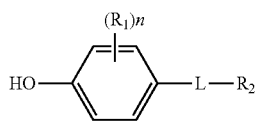

wherein R$_1$ represents a C1-9 linear or branched alkyl, n is an integer of 1-4, whereby n>1 indicates an individual ring structure has a plurality of substituted moieties R$_1$, which is identical or different, R$_2$ represents a C1-36 linear or branched alkyl; L is —C—C—, —O—, —COO—, —OCO—, —CH$_2$O—, —OCH$_2$O—, —O(CH$_2$)$_2$O—, —COCH$_2$—, or methylenyl.

8. The liquid crystal medium composition as claimed in claim 1, wherein the negative liquid crystal material has a weight that is of an amount of 99-99.9% of the total weight of the liquid crystal medium composition, the reactive monomer having a weight that is of an amount of 0.1-1% of the total weight of the liquid crystal medium composition, and the stabilizer is of an amount of 10-100 ppm.

9. A liquid crystal medium composition of liquid crystal display, comprising: a negative liquid crystal material, reactive monomer, an initiator, and a stabilizer, the initiator functioning to induce photo polymerization of the reactive monomer;

wherein the initiator has at least one of the following structural formulas:

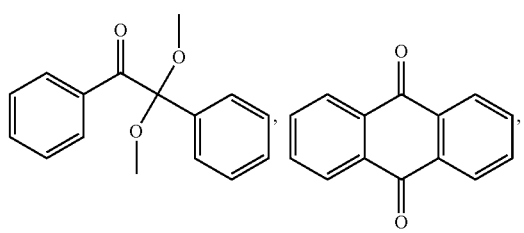

-continued

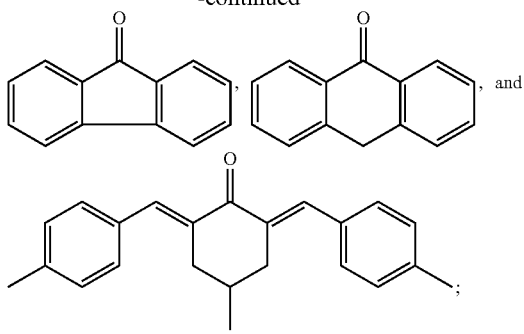, and

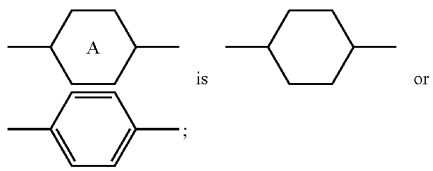;

wherein the initiator is of an amount of 5-1000 ppm in the liquid crystal medium composition;
wherein the negative liquid crystal material comprises at least one liquid crystal compound having the following formula:

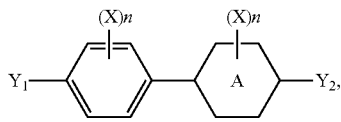

wherein in the formula,

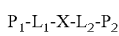 is 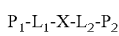 or 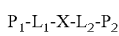;

X represents substituted moieties connected to the rings, n being an integer of 1-4, n being of different or the same values for different rings, whereby n>1 indicates an individual ring structure has a plurality of identical or different substituted moieties X, X being: —H, —F, —Cl, —Br, —I, —CN, or —NO$_2$; Y1 and Y2 are —R, —O—R, —CO—R, —OCO—R, —COO—R, or —(OCH$_2$CH$_2$)n$_1$CH$_3$, R representing a C1-12 linear or branched alkyl, n$_1$ being an integer of 1-5, Y1 and Y2 being identical or different;
wherein the reactive monomer comprises at least one polymerizable compound having the following formula:

P$_1$-L$_1$-X-L$_2$-P$_2$ wherein P$_1$ and P$_2$ represent polymerizable moieties, which are identical or different, P$_1$ and P$_2$ being methacrylate, acrylate, ethenyl, ethyleneoxy, or epoxy groups; L$_1$ and L$_2$ represent linking moieties, which are identical or different, L$_1$ and L$_2$ being —C—C—, —O—, —COO—, —OCO—, —CH$_2$O—, —OCH$_2$O—, —O(CH$_2$)$_2$O—, —COCH$_2$—, or methylenyl; X represents a core moiety, which has the following formula:

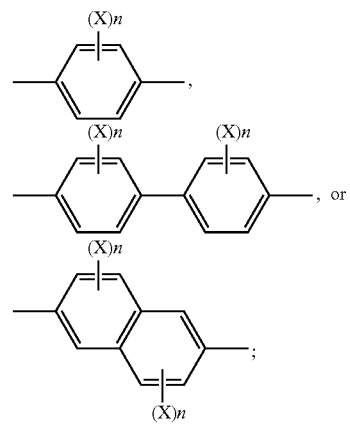

wherein in the formula of the core moiety X, x represents a substituted moiety connected to the ring structure, n is an integer of 1-4, whereby n>1 indicates an individual ring structure has a plurality of substituted moieties x, which is identical or different, x being specifically —H, —F, —Cl, —Br, —I, —CN, or —NO$_2$;
wherein the stabilizer comprises at least one stabilizer compound represented by the following formula:

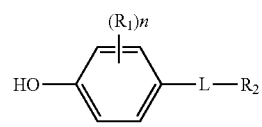

wherein R$_1$ represents a C1-9 linear or branched alkyl, n is an integer of 1-4, whereby n>1 indicates an individual ring structure has a plurality of substituted moieties R$_1$, which is identical or different, R$_2$ represents a C1-36 linear or branched alkyl; L is —C—C—, —O—, —COO—, —OCO—, —CH$_2$O—, —OCH$_2$O—, —O(CH$_2$)$_2$O—, —COCH$_2$—, or methylenyl;
wherein the negative liquid crystal material is of an amount of 99-99.9% of the total weight of the liquid crystal medium composition, the reactive monomer is of an amount of 0.1-1% of the total weight of the liquid crystal medium composition, and the stabilizer is of an amount of 10-100 ppm.

* * * * *